(12) United States Patent
Miller et al.

(10) Patent No.: US 7,574,365 B2
(45) Date of Patent: Aug. 11, 2009

(54) END-TO-END SOLUTION FOR DIRECT STORE DELIVERY

(75) Inventors: Ralf Miller, Karlsruhe (DE); Wolfgang Peter, Bruchsal (DE); Glenn Irwin, Atlanta, GA (US)

(73) Assignee: SAP AG, Walldorf (DE)

( * ) Notice: Subject to any disclaimer, the term of this patent is extended or adjusted under 35 U.S.C. 154(b) by 879 days.

(21) Appl. No.: 10/747,142

(22) Filed: Dec. 30, 2003

(65) Prior Publication Data
US 2005/0144127 A1 Jun. 30, 2005

(51) Int. Cl.
*G06Q 30/00* (2006.01)
*G06F 7/00* (2006.01)
(52) U.S. Cl. .......................... 705/1; 700/214
(58) Field of Classification Search .............. 705/1, 705/22, 25; 700/214, 217, 229, 302
See application file for complete search history.

(56) References Cited

U.S. PATENT DOCUMENTS

| | | | |
|---|---|---|---|
| 5,758,329 A * | 5/1998 | Wojcik et al. ............. | 705/28 |
| 6,332,098 B2 * | 12/2001 | Ross et al. ............... | 700/226 |
| 6,876,958 B1 * | 4/2005 | Chowdhury et al. ....... | 703/7 |
| 2003/0233190 A1 * | 12/2003 | Jones ..................... | 701/207 |
| 2004/0093233 A1 * | 5/2004 | Teller ..................... | 705/1 |
| 2004/0107110 A1 * | 6/2004 | Gottlieb et al. ........... | 705/1 |
| 2004/0153207 A1 * | 8/2004 | Peck ...................... | 700/214 |
| 2007/0174144 A1 * | 7/2007 | Borders et al. ............ | 705/27 |

OTHER PUBLICATIONS www.schwans.com, as archived on Feb. 29, 2000, Welcome, About and Frequently Asked Questions, pp. 1-5.*
SAP AG, SAP Beverage Using SAP® SAP 4.6c (SAP Bev 461) Master Guide, May 31, 2003, Document Version 1.00, © SAP AG 2002.
SAP AG, Direct Store Delivery Release 622, Jul. 15, 2003, © SAP AG 2003.
SAP AG, SAP DSD Cockpit Release 623, Jul. 15, 2003, © SAP AG 2003.
SAP AG, Direct Store Delivery SAP Technical Brief mySAP Consumer Products, Jan. 11, 2003, © SAP AG 2003.
SAP AG, SAP Mobile Direct Store Delivery Release 1.0 Installation Guide Document Version 1.0, Jul. 11, 2003, © SAP AG 2003.

* cited by examiner

*Primary Examiner*—Jamisue A Plucinkski
(74) *Attorney, Agent, or Firm*—Kenyon & Kenyon LLP

(57) ABSTRACT

Embodiments of the present invention provide a direct delivery of consumer products bypassing retailer's warehouses. Embodiments of the present invention provide an end-to-end solution for direct store delivery. A direct store delivery order may be generated based on one or more received customer orders. Vehicle space optimization instructions may be generated based on one or more products to be delivered based on the one or more received orders. An order to retrieve the one or more products and an order to load the one or more products on to a transport vehicle based on the vehicle space optimization instructions may be generated. A travel route for the transport vehicle for delivering the one or more products to customers may be provided.

20 Claims, 5 Drawing Sheets

END-TO-END SOLUTION FOR DIRECT STORE DELIVERY

BACKGROUND OF THE INVENTION

The present invention relates to a system and method for product distribution. In particular, the present invention relates to delivering products directly to the end customer bypassing retailer's warehouses.

Consumer product goods (CPG) companies are engaged in continuous improvement of the delivery process. Given the intense competition between brands and in an effort to reduce costs, CPG companies have a vital interest in direct interaction with their customers. These customers may include, for example, retailers, restaurants, consumers, etc. CPG companies are under pressure to increase operating efficiencies since the markets served are relatively slow growing.

Conventional consumer product delivery processes suffer from many disadvantages. First, most deliveries are sent to a retailer's warehouse without direct interaction with end customers, so CPG companies don't have direct influence on consumers. Even if the CPG company delivers directly to customers, the delivery drivers are only equipped to deliver pre-ordered goods and do not have any flexibility in selling the goods. For example, delivery drivers cannot provide direct promotion or sales of the manufacturer's key products, cannot cross sell or up sell during the delivery process, are unable to change customer orders and cannot fulfil additional orders for goods from truck stock.

Using conventional techniques, CPG companies lack the ability to check promotion-display compliance in customer outlets with existing agreements to make sure that their products are always fully stocked and well merchandized on shelves or at display locations. Material loss is a problem and the current paper-based systems make it difficult to locate and track problems since route accounting may not take place for some days after an event.

Therefore, it is desirable to have a customer product delivery system that overcomes the disadvantages of conventional delivery techniques. It is desirable to have a direct store delivery process that provides a higher level of customer interaction with CPG companies and provides flexibility in the direct delivery process.

DETAILED DESCRIPTION

Embodiments of the present invention relate to a direct store delivery (DSD) system, method and apparatus. Embodiments of the present invention provide an end-to-end solution for direct store delivery.

In embodiments of the present invention, DSD enables efficient ordering, use, processing and/or delivery of products to customers or any other entity. DSD may find applications in the consumer products industry for secondary distribution of products, for example. These products may be delivered to the end customer bypassing, for example, a retailer's warehouses. DSD may offer faster product availability and provides consumer products goods (CPG) companies with direct influence of and/or contact with consumers.

Figure 1:
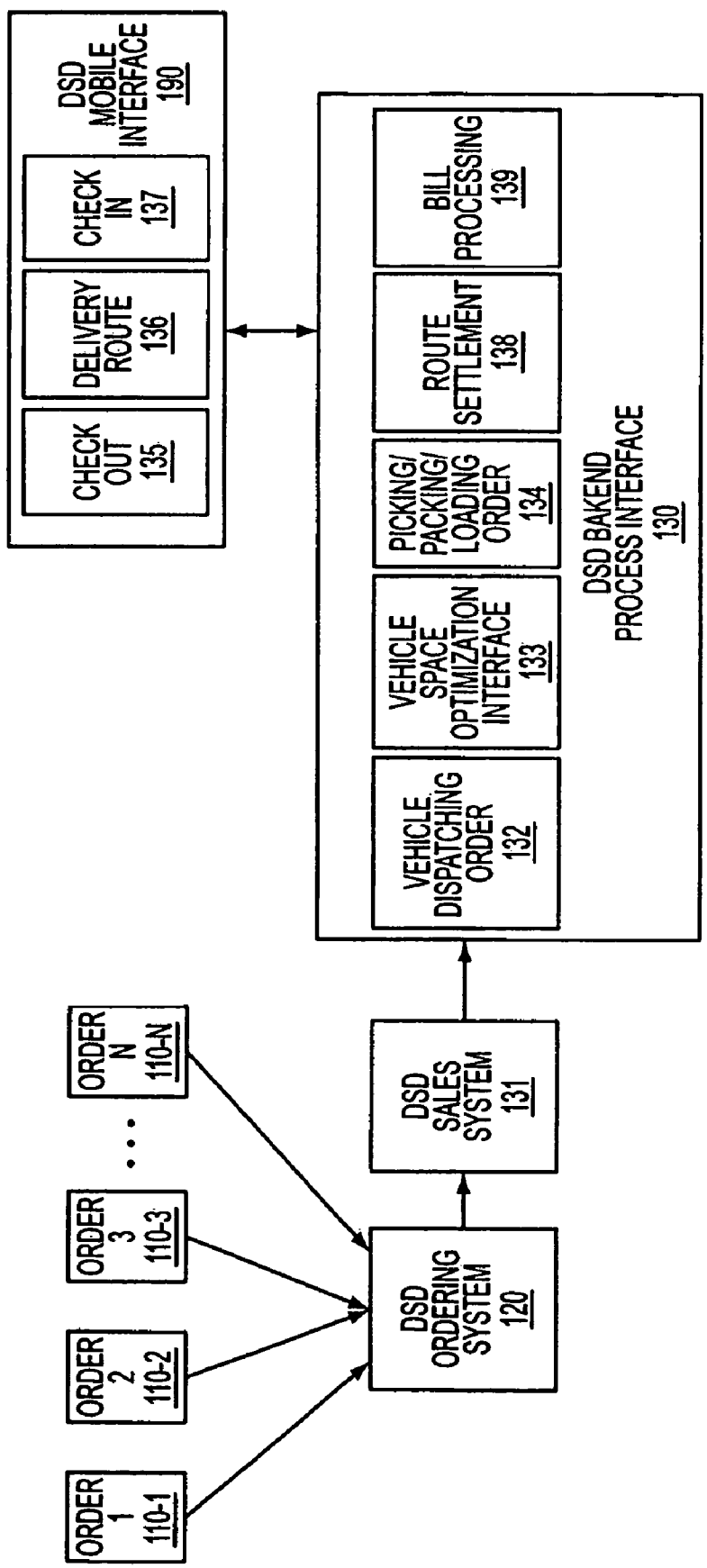
FIG. 1 is a block diagram illustrating a direct store delivery system in accordance with embodiments of the present invention.

FIG. 1 is a block diagram illustrating the operations of a DSD system in accordance with an embodiment of the present invention. As shown in FIG. 1, orders 110-1 to 110-N may be received at a DSD ordering system 120. The DSD system 120 processes the customer's orders so that the products requested by the customers can be delivered directly to the customer efficiently and accurately. The DSD ordering system 120 may be provided via a customer resource management (CRM) system or the like. The DSD system 120 may forward requests to a DSD sales system 131. The DSD sales order system may be provided via a enterprise resource planning system or the like. Although ordering system 120 and sales system 131 are shown as separate systems, it is recognized that these systems may be incorporated into a single system. Moreover, orders 110-1 to 110-N such as customer's orders can be input directly into the DSD sales system 131, in accordance with embodiments of the present invention.

In embodiments of the present invention, a backend process interface 130 may process at least a portion of the DSD backend process. The process interface 130 may communicate with a DSD mobile interface 190, in accordance with embodiments of the present invention. The DSD mobile interface may be embodied in a portable device such as a lap-top computer, a personal digital assistant (PDA), a tablet PC, a palm-top computer, and/or any other type of device.

In embodiments of the present invention, orders 110-1 to 110-N may be placed by customers using a network, for example, an Internet connection, Intranet connection, a wide area network (WAN) connection, a local area network (LAN) connection, a wireless connection, by telephone (e.g., wireless and hardware) and/or via any other communications media and/or combination thereof. As indicated above, customers may communicate with the DSD ordering system 120 and/or the sales system 131. It is also recognized that customers may place orders via the DSD mobile interface 190. To this end, the DSD mobile interface 190 may incorporate the functionality of the ordering system 120 and/or sales system 131. Optionally or additionally, the DSD mobile interface 190 may communicate with the ordering system 120 and/or sales system 131 to receive and/or process a customer's orders.

In embodiments of the present invention, orders may be processed via out-bound telesales and/or by sales representatives taking the orders. In other cases, orders may be take via in-bound telesales, Internet sales and/or EDI, a common format for Electronic Data Interchange. In embodiments of the present invention, a mobile DSD may be used for taking and/or processing orders.

In an embodiment of the present invention, customers may be contacted directly at preset calling times via a call center to generate orders. However, customers can contact a call center to place orders at their own convenience. Call center agents may have sales history information, new item information, promotional information and/or any other information to assist in expediting the customer's orders.

In embodiments of the present invention, a customer relationship management (CRM) system (e.g. Interaction Center, Online and Mobile Sales) may be used to take and/or process orders. The DSD ordering system 120, sales ordering system 131 and/or DSD backend process interface 130 may identify the requested products, cost, delivery time, identity and/or or location of the ordering party, payment terms, etc.

In embodiments of the present invention, other features of the DSD system 120 may include determination of the requested delivery date of the sales document according to the next planned delivery date from visit planning. The DSD system may permit manual deviation from a planned delivery date and suggestion of the next or previous delivery date. Thus, as orders are received, the DSD system may allow access to all planned delivery dates associated with the customer's location.

A delivery driver may also be involved in processing the sales order via a mobile or wireless interface. For example, the delivery driver or personnel may have all relevant information on a handheld device to deliver pre-sold orders to the customers. The delivery driver may have additional product loaded on the truck in addition to the pre-sold orders. The driver may sell the additional product to customers, which were not included on the original order. Accordingly, additional products may be sold to generate additional revenue. Moreover, the delivery personnel may take orders for future delivery using the mobile DSD interface, for example. In embodiments of the present invention, necessary transactional and/or master data may be downloaded to a mobile DSD system. Interface objects may be represented as the shipment and/or the visit list with associated information on customer, material, pricing, vehicle, driver, order and/or invoice.

In an embodiment of the present invention, DSD orders may be processed by the DSD backend process interface 130 which may be incorporated in the ordering system 120, sales system 131 and/or mobile interface 190. It is recognized that DSD backend process interface 130 may be incorporated within a stand-alone and/or network computer and/or other processing device. The backend process interface 130 may provided the end-to-end DSD solution in accordance with embodiments of the present invention. The DSD backend process 130 may generate vehicle dispatching orders 132. Dispatching orders 132 may assign sales orders with their respective deliveries to a shipment, and may assign a vehicle and a driver. The dispatching algorithm may consider restrictions regarding maximum vehicle capacities (e.g. weight, volume, quantity, number of stops, number of skip stops). In generating the dispatching orders 132, the DSD interface 130 may consider the customers to be visited, deliveries to be completed, pre-sold orders, potential new orders, and/or any other information to generate a time and/or cost efficient route. The DSD backend interface 130 may assign dispatching orders based on a variety of factors, for example, customers that are to be visited together. In embodiments of the present invention, additional quantities for customers without pre-order may be assigned manually thus allowing a mixed business model or a transition from pure van sales to pre-sold order taking.

In embodiments of the present invention, the DSD backend interface 130 may interface to a $3^{rd}$ party software tool to optimize vehicle spacing. In other words, the DSD backend interface 130 may include a vehicle space optimization (VSO) interface 133 that may suggest how a single truck, trailer and/or other transport mechanism may be optimally loaded. The goods may be palletized per customer or per material and layers can be built. The VSO interface 133 can, for example, display the truck content directly inside the backend in 3-dimensional color graphics, and the user may modify/repack the truck by a drag and drop process. Once the transport vehicle is optimized, the user can release the truckload to the warehouse and create transfer orders for pallet-oriented picking. The VSO interface 133 can model and optimize bulk (back-load) or bay trucks (e.g. side-load beverage trucks) with variable dimensions and number of bays. VSO interface 133 results may be used with any backend warehouse process.

In embodiments of the present invention, the DSD backend interface 130 may generate orders 134 for picking and packing. Loading of the orders can be confirmed for the products to be delivered to customers. Order(s) 134 may be generated based on a plurality of factors such as the type of products, product source and/or destination, palletization from vehicle space optimization, and/or other factors. It is recognized that standard processes may be used for picking packing and loading products.

In an embodiment of the present invention, if pre-sold orders for all customers were taken, the shipment with its deliveries is the base for the information to be downloaded to a mobile device and delivered by the delivery driver. In case some pre-sold orders were taken and the driver wants to visit the other customers additionally, the driver can have additional product to be loaded by request. The load planner can assign a customer-independent load delivery to the shipment and download it to the handheld device with the shipment, its customer deliveries and all visits. This is a mixed van sales model that allows higher customer service level and transition from pure van sales towards customers ordering prior to delivery.

Orders taken on route with, for example, the DSD mobile interface 190 or other remote device may be transferred to the DSD backend interface 130. Synchronization through standard integration may be possible to have the sales information accessible using a local system.

In embodiments of the present invention, the DSD mobile interface 190 may process a check out procedure 135 in accordance with an embodiment of the present invention. During check out, the loaded quantities may be validated and/or deviations may be recorded. Check out may reflect the responsibility transfer from the warehouse to the driver. The checkout process can be configured to have a supervisor or the like acknowledge, for example, check out quantity, deviations along with reason codes, and/or to indicate that the check out is complete. Moreover, the driver may at this time verify the customer orders, payment information, direct sale products, and/or the predefined route, for example. In accordance with embodiments of the present invention, shipments may be created by consolidating customer deliveries along predefined routes, so that orders can be completed as efficiently and quickly as possible.

In embodiments of the present invention, the DSD mobile interface 190 may generate and/or store a delivery route 136. The interface 190 may generate the basic tour data, recorded it and/or validate it. This may include, for example, driver ID, vehicle ID, odometer reading, etc. Once this procedure is completed, the driver may begin predetermined route. Route settlement 138 may occur in the DSD backend interface 130 and/or DSD mobile interface 190.

In embodiments of the present invention, the delivery driver or other personnel may use DSD mobile interface 190 such as a personal digital assistant (PDA) or the like that may incorporate the functionality of the DSD system and/or may communicate with the DSD system. It is recognized that the functionality described with reference to the mobile interface 190 may be included in the DSD backend process interface 130.

In embodiments of the present invention, mobile device 190 may include, for example, the DSD backend system 130. Such device may assist the user in processing, completing and/or billing the customer's orders. The user may view the route including a list of all visits to be made. For each such entry, the user or driver may perform the associated activity(s) or may update the visit status with a reason code indicating why the visit was not performed (customer closed, ran out of time, etc.). The reason code may be used in the backend to determine the subsequent business process accordingly. In embodiments of the present invention, the driver may have the ability to rearrange the sequence of the visits, and create new un-planned visits. Unplanned visits may occur for an existing customer, who was downloaded in addition to the customers on his shipment/visit list or a new customer.

In embodiments of the present invention, as the driver reaches the destination, the driver may complete the deliveries and may generate the appropriate comments using his hand held as the deliveries are completed. The driver may deliver the pre-ordered products to the customers and may print a delivery note or invoice which is given to the customer. Should changes to the delivery be required, either at the driver or the customer's request, the driver changes the quantity of delivered goods and/or or other information related to the order. Using the DSD mobile interface 190, the driver may have the ability to add items, reduce items, change items, etc. Such changes may reflect, for example, less quantity sold due to breakage in transit, customer returns and/or other reasons. The return of goods (e.g. spoiled goods, wrong shipment, etc.) as well as the return of empties is supported. The driver is able to add returned goods and empties to deliveries. The change may also reflect increased sale due to the driver's sales efforts.

The DSD system may permit products to be sold directly from the delivery trucks and without pre-sold orders. For example, products may be delivered without first being in the backend system entered orders. The driver in essence sells the materials directly off his vehicle. In this process the driver creates new deliveries. This includes both normal outbound and return inbound deliveries. The physical processing of the delivery is similar to deliveries of pre-sold orders.

In embodiments of the present invention, the DSD delivery and invoicing may be combined into a single process or may be separate processes. Depending on the customer's payment terms, the delivery driver may issue a legal invoice to customers. Customers who are not invoiced may receive a delivery note instead of an invoice. The invoices may be transferred into the backend system and posted to financial records using data from, for example, the mobile device.

In the DSD system, drivers may collect payments for current deliveries or outstanding open items from customers and customers may be issued payment receipts. Collections from customers may be dropped at a bank as well as at the company's internal cashier. The receipt may be handled as a special kind of payment and settled together with the other invoices and payment receipts. In embodiments of the present invention, DSD bill processing 139 may occur at the DSD backend process interface and/or at the DSD mobile interface 190.

In embodiments of the present invention, using the functionality of a DSD capable mobile device, drivers may take direct orders from customers for future delivery. These orders may then be delivered in a subsequent visit. By using this feature of the DSD system, the delivery driver can also act as an order processor. The driver may further use the DSD capable mobile device to record miscellaneous inventory adjustments, trades between drivers, to record miscellaneous expenses, such as tolls, parking fees, gas, etc.

The driver delivers the product to the customers, returns to the warehouse and checks in the returned product (unsold and returned product, returned empties) and collected payments. Product and payments may be reconciled at this time. Route Accounting contains the interface to the handheld application mobile DSD.

In embodiments of the present invention, the delivery driver may engage in a check-in process 137 to validate material to be returned to the warehouse. The check in process 137 may be processed at the DSD mobile interface 190 and/or DSD backend process interface 130. in any event, during the check in process, the driver may enter returned quantities, which then potentially have to be verified and approved by a supervisor. Pre-settlement balancing may be performed to validate the returned materials (beginning balance–deliveries+returns=check-in balance). After completion of the delivery route, the driver may record end of tour data such as ending odometer reading and recorded returned cash/payments. Pre-settlement balancing is performed to validate the returned cash/payments (beginning balance–driver expenses–payments to customers+collections from driver+ collections from customers=end-of-day balance).

It is recognized that the system and/or process shown in FIG. 1 and described above in accordance with embodiments of the present invention, may be implemented using appropriate computer systems which may include processor(s) storage device(s), I/O device(s), and/or other hardware and/or software in accordance with embodiments of the present invention. It is recognized that embodiments of the present invention may be processed using a personal digital assistant (PDA), a PC, a computer network, mainframe, and/or type of electronic device.

Figure 2:
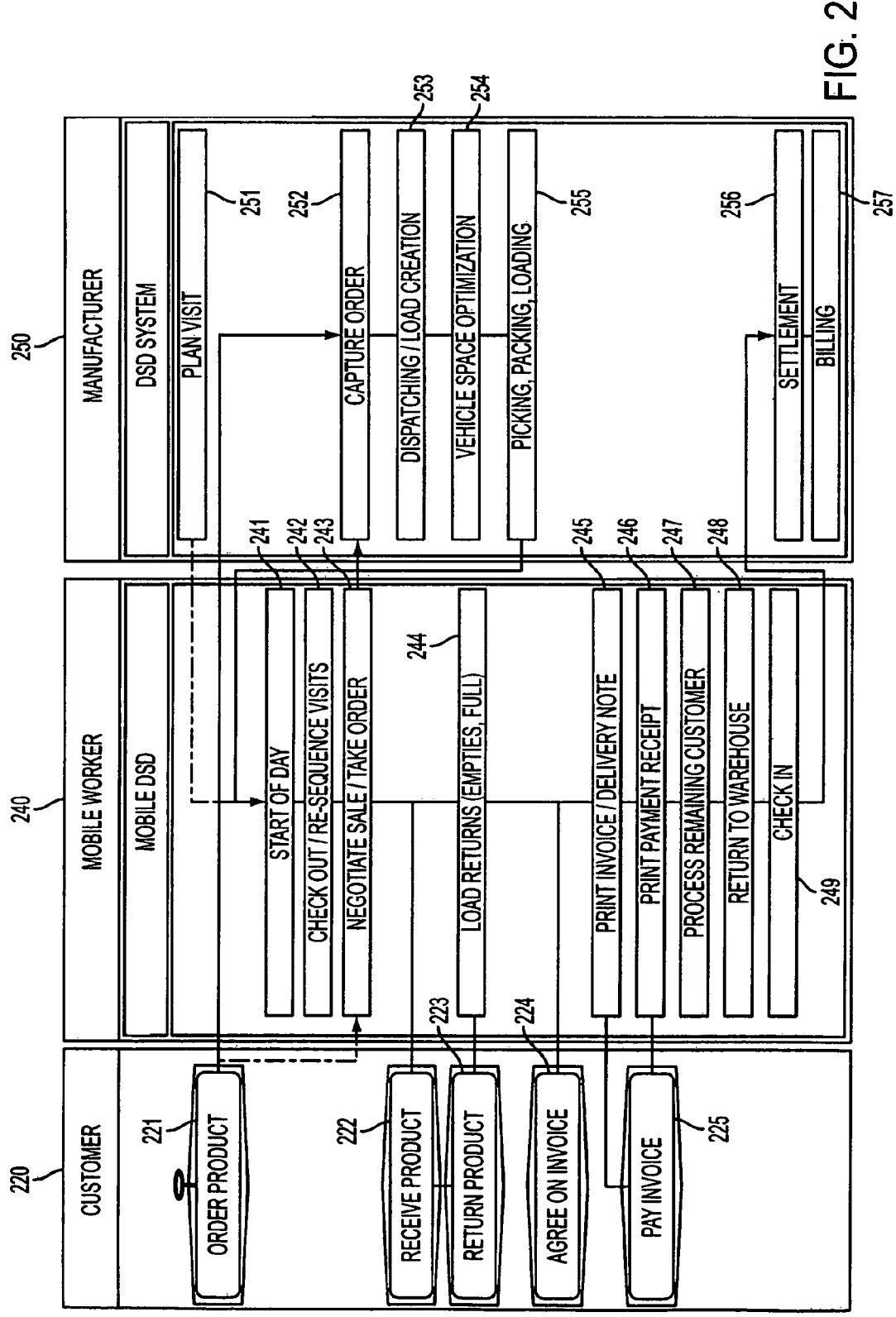
FIG. 2 is a direct store delivery process flow diagram in accordance with an embodiment of the present invention.

FIG. 2 is a direct store delivery process flow diagram, in accordance with an embodiment of the present invention. Orders may be generated at customer 220 and may be processed at the mobile DSD 240 and/or at the central DSD system 250. As shown in box, 221, a customer may order one or more products. The DSD system 250 may capture the product order and generate a new DSD order to be processed by the mobile DSD 240 and/or central DSD systems 250, as shown in box 252. As shown in box 251, the central DSD system 250 may be planning other visits or the like to deliver products to customers. As shown in boxes 252 and 253, the order for the one or more products may be dispatched and a vehicle space optimization process 254 may be interfaced to generate diagrams and/or instruction for optimally loading the transport vehicle. As shown in box 255, picking, packing, and loading of the products may occur.

In embodiments of the present invention, the new DSD order may be transmitted to the mobile DSD 240. As shown in boxes 241 and 242, the start of day process may begin and visits may be re-sequenced based on the new DSD order. The mobile worker may continue to negotiate the sale and/or modify the order in accordance with requests from the customer 220, as shown in box 243. Once the transport vehicle is loaded, the worker may begin the first deliver based on the established route. As shown in box 222, the customer may receive products. If the customer wishes, the customer may return one or more products and these returns may be accounted for at the mobile DSD, as shown in boxes 223 and 244. Once an invoice is agreed to, a copy may be presented to the customer who may pay the invoice, as shown in boxes 224, 245, 225 and 246. The remaining customers may be processed, as shown in box 247.

In embodiments of the present invention, once all customers are processed, the mobile worker may return to the warehouse and begin a check-in procedure, as shown in boxes 248 and 249. The data from the mobile DSD 240 may be downloaded by the central DSD system 250 and/or may be periodically sent to the DSD system 250 using a suitable wireless protocol. The central DSD system 250 may begin a settlement procedure to reconcile the return products and/or the received payments, as shown in box 256. The DSD system 250 may begin a billing process to generate the proper bills and/or invoices, as shown in box 257.

Although the mobile DSD system 240 and central DSD system 250 are shown as two separate devices, it is recognized these devices may be combined into a single device. Moreover, the functionality shown and/or described herein with respect to one device may be performed at another device.

Figure 3:
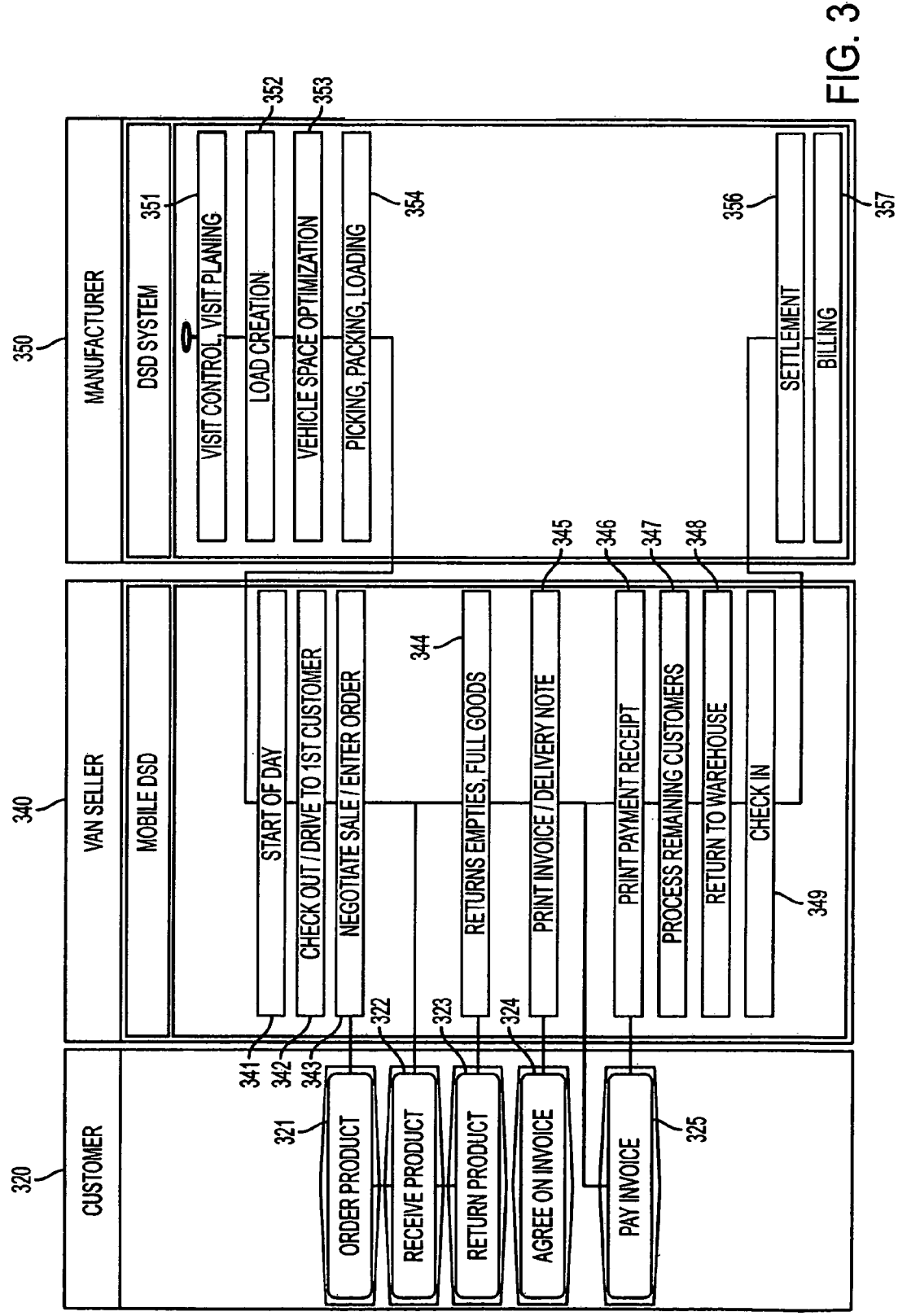
FIG. 3 is a direct store delivery process flow diagram in accordance with an embodiment of the present invention.

FIG. 3 is a direct store delivery process flow diagram, in accordance with an embodiment of the present invention. This diagram illustrates how sales may be made using the DSD system, in accordance with an embodiment of the present invention. As shown in box 351, the central DSD system 350 may generate product lists and/or route plans for visits to customer locations to directly sell products using, for example, the mobile DSD 340. As shown in boxes 352 and 353, based on the generated products list, an order may be dispatched and a vehicle space optimization process may be employed to generate diagrams and/or instruction for optimally loading one or more transport vehicles. As shown in box 354, picking, packing, and loading of the products may occur.

In embodiments of the present invention, the new DSD order may be transmitted to the mobile DSD 340. As shown in boxes 341 and 342, the start of day process may begin and the worker may check out. Once the transport vehicle is loaded, the worker may begin the first delivery based on the established route. Based on the planned route, the first customer may be visited. The customer 320 may order one or more products and the DSD worker may negotiate the sale and/or enter the order in the mobile DSD system 340 in accordance with requests from the customer 320, as shown in boxes 321 and 343.

As shown in box 322, the customer may receive products. If the customer wishes, the customer may return one or more products and these returns may be accounted for at the mobile DSD, as shown in boxes 323 and 344. Once an invoice is agreed to, a copy may be presented to the customer who may pay the invoice, as shown in boxes 324, 345, 325 and 346. The remaining customers may be processed, as shown in box 347.

In embodiments of the present invention, once all customers are processed, the mobile worker may return to the warehouse and begin a check-in procedure, as shown in boxes 348 and 349. The data from the mobile DSD 340 may be downloaded by the central DSD system 350 and/or may be periodically sent to the DSD system 350 using a suitable wireless protocol. The central DSD system 350 may begin a settlement procedure to reconcile the return products and/or the received payments, as shown in box 356. The DSD system 350 may begin a billing procedure to generate the proper bills and/or invoices, as shown in box 357.

Although the mobile DSD system 340 and central DSD system 350 are shown as two separate devices, it is recognized these devices and/or system may be combined by an integrated end-to-end process into a single direct store delivery solution. Moreover, the functionality shown and/or described herein with respect to one device may be performed at another device.

It is recognized that embodiments of the present invention may be processed in a standalone and/or network computer. For example, the DSD system may be incorporated in and/or implemented using a standalone computer and/or a computer network. It is recognized that customer related, product related, billing related, etc. information may be stored in one or more databases located in any type of data storage device and/or memory. These storage memories may be located internal to and/or internal to these computers. Appropriate communications networks, interfaces and/or other hardware may be included in the DSD system described herein, in accordance with embodiments of the present invention.

Figure 4:
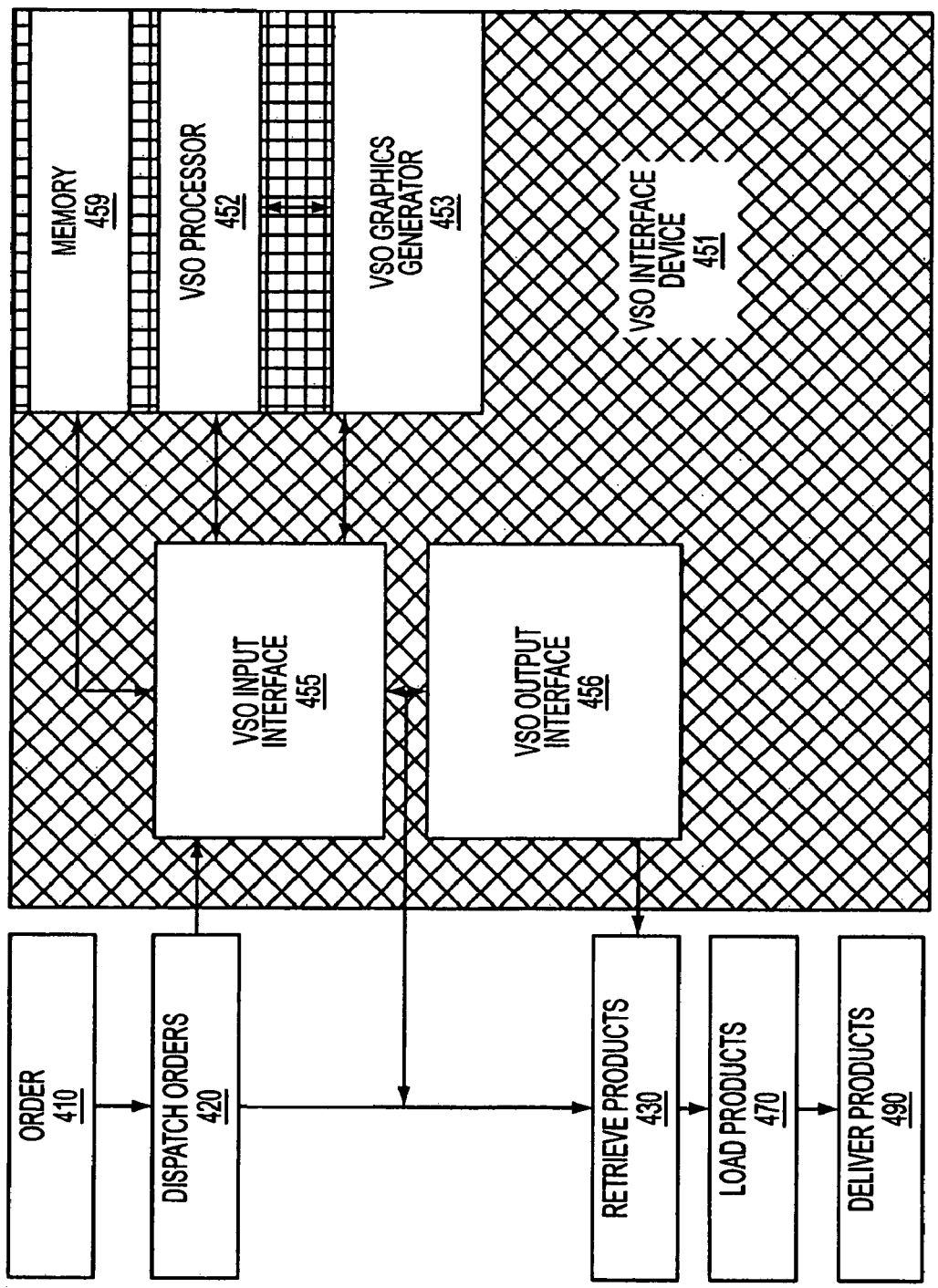
FIG. 4 is a diagram illustrating vehicle space optimization in direct store delivery in accordance with an embodiment of the present invention.

FIG. 4 is a block diagram illustrating vehicle space optimization in direct store delivery in accordance with an embodiment of the present invention. As shown in FIG. 4, an order 410 may be received and the order 420 is dispatched. As the orders are dispatched, the orders may be sent to a vehicle space optimization (VSO) device 451. The VSO 451 may optimize space in the transport vehicles so that the transport vehicles are optimally loaded. The VSO device 451 may include an input interface 455. The input interface 455 may receive the orders and may retrieve information about the products associated with the orders. The interface 455 may retrieve from memory 459, for example, the dimensions of one or more product packages, weight, and/or other information associated with the packages. The interface 455 may also retrieve from memory 459 information associated with the transport vehicles such as the number of vehicles to be loaded, the size and/or interior dimensions of the vehicle(s), weight capacity and/or other information related with the transport vehicles. The VSO interface 455 may also retrieve route information to determine the locations each vehicle may be traveling to and/or where products may need to be delivered.

In embodiments of the present, the input interface may transmit all the information related to the product, transport vehicles, routes, etc. to VSO processor 452 which may employ a VSO algorithm that may determine how the transport vehicle or vehicles may be optimally loaded. The VSO graphics generator 453 may generate a graphic or image of the optimally loaded transport vehicle. The generator 453 may generate a 3-dimensional image and/or video graphics that may show how the vehicle should be loaded. The images generated may be transmitted to the mobile and/or central DSD system. In embodiments of the present invention, the VSO out put interface may generate directions to instruct how the vehicles should be loaded.

In embodiments of the present invention, the data generated by the VSO interface device 451 may be used to retrieve products 430 (e.g., product picking), load products 470 and deliver products 490 to customers.

Figure 5:
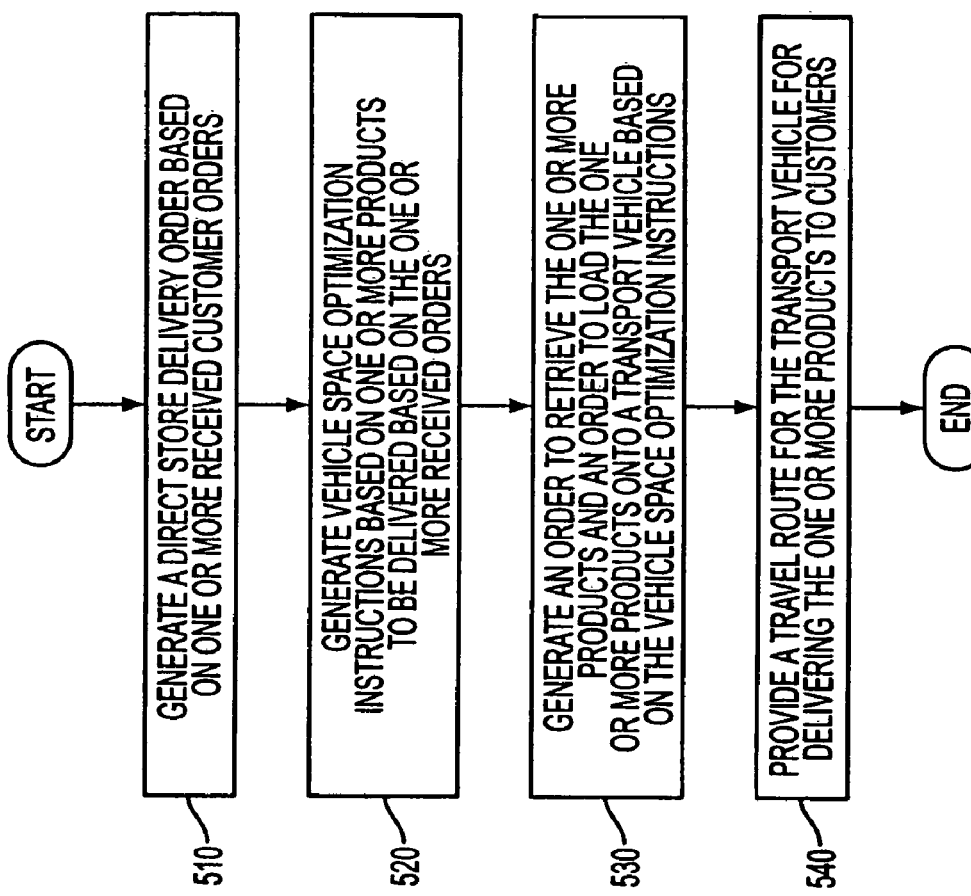
FIG. 5 is a flowchart illustrating a method in accordance with an embodiment of the present invention.

FIG. 5 is a flowchart illustrating a method in accordance with an embodiment of the present invention. As shown in box 510, a direct store delivery order may be generated based on one or more received customer orders. Vehicle space optimization instructions may be generated based on one or more products to be delivered based on the one or more received orders, as shown in box 520. As shown in box 530, an order to retrieve the one or more products and an order to load the one or more products on to a transport vehicle based on the vehicle space optimization instructions may be generated. A travel route for the transport vehicle for delivering the one or more products to customers may be provided, as shown in box 540.

It is recognized that a computer, hand held devices or other processing devices on which embodiments of the present invention may be processed, may contain the appropriate software and/or hardware (e.g., one or more processors, I/O devices, etc) to carry out the functionality as described herein. Appropriate fields in the various databases described herein may be searched for product related information. A program or macro may be created that may specify the fields to search based on the type of information required.

Several embodiments of the present invention are specifically illustrated and described herein. However, it will be appreciated that modifications and variations of the present invention are covered by the above teachings and within the purview of the appended claims without departing from the spirit and intended scope of the invention.

What is claimed is:

1. A method for direct delivery of consumer products, comprising:
   generating a direct store delivery order based on one or more received customer orders;
   generating vehicle space optimization instructions using a vehicle space optimization interface for loading a transport vehicle with a first group of products to be delivered based on the one or more received customer orders and a second group of products not based on the one or more received customer orders, wherein generating vehicle space optimization instructions comprises;
      generating using a vehicle space optimization graphics generator an image of how the transport vehicle should be loaded according to the vehicle space optimization instructions;
      generating using the vehicle space optimization graphics generator video graphics showing how the transport vehicle should be loaded in accordance with the vehicle space optimization instructions; and
      transmitting to a direct store delivery mobile device the image of how the transport vehicle should be loaded according to the vehicle space optimization instructions and the video graphics showing how the transport vehicle should be loaded in accordance with the vehicle space optimization instructions;
   generating using the vehicle space optimization interface an order to retrieve the first group of products and the second group of products and an order to load the first group of products and the second group of products on to the transport vehicle based on the video graphics showing how the transport vehicle should be loaded;
   loading the first group of products and the second group of products on to the transport vehicle based on the video graphics showing how the transport vehicle should be loaded;
   providing a travel route for the transport vehicle for delivering the first group of products and the second group of products to customers; and
   delivering the first group of products to the customers.

2. The method of claim 1, further comprising:
   printing invoices for the one or more received customer orders.

3. The method of claim 1, further comprising:
   generating receipts based on invoice payments.

4. The method of claim 1, wherein one of the customers is a residential customer.

5. The method of claim 1, wherein one of the customers is a restaurant.

6. The method of claim 1, wherein the vehicle space optimization instructions are related to loading a pallet.

7. The method of claim 1, further comprising:
   generating vehicle triggered pick slips to retrieve the first group of products and the second group of products.

8. The method of claim 1, wherein the travel route is based on completing a maximum numbers of deliveries without exceeding a maximum amount of time.

9. The method of claim 1, wherein the one or more received customer orders include a pre-planned date of delivery.

10. The method of claim 8, wherein the one or more received customer orders include a time of delivery.

11. A system comprising:
    an input interface to receive one or more customer orders;
    a direct store delivery processor coupled to the input interface, the direct store delivery processor to generate a direct store delivery order based on the one or more received customer orders;
    a vehicle space optimization interface coupled to the direct store delivery processor to generate transport vehicle space optimization instructions for loading a transport vehicle with a first group of products to be delivered based on the one or more received customer orders and a second group of products not based on the one or more received customer orders, wherein the direct store delivery processor is to generate an order to retrieve the first group of products and the second group of products and an order to load the first group of products and the second group of products on to the transport vehicle based on video graphics showing how the transport vehicle should be loaded,
    wherein generation of the transport vehicle space optimization instructions comprises;
       generating using a vehicle space optimization graphics generator an image of how the transport vehicle should be loaded according to the vehicle space optimization instructions;
       generating using the vehicle space optimization graphics generator the video graphics showing how the transport vehicle should be loaded in accordance with the vehicle space optimization instructions; and
       transmitting to a direct store delivery mobile device the image of how the transport vehicle should be loaded according to the vehicle space optimization instructions and the video graphics showing how the loading of the transport vehicle should be loaded in accordance with the vehicle space optimization instructions.

12. The system of claim 11, wherein the direct store delivery processor is to generate a travel route for the transport vehicle for delivering the first group of products and the second group of products to customers.

13. The system of claim 11, further comprising:
    wherein the direct store delivery processor transmits the generated travel route to the direct store delivery mobile device.

14. A method for direct store delivery of products, comprising:
    receiving a plurality of orders for direct delivery to consumers;
    identifying one or more orders from the plurality of orders to be delivered via a single delivery route;
    generating a picking order to retrieve a first group of products associated with the one or more identified orders and a second group of products not associated with the one or more identified orders;
    generating vehicle space optimization instructions for loading a transport vehicle with the first group of products and the second group of products, wherein the instructions specify how the transport vehicle is to be loaded based on the first group of products and the second group of products and the delivery route and wherein generating the vehicle space optimization instructions further comprises:
       generating an image of how the transport vehicle should be loaded according to the vehicle space optimization instructions;
       generating one of a three-dimensional image and a video graphic showing how the transport vehicle should be loaded in accordance with the vehicle space optimization instructions; and transmitting to a direct store delivery mobile device the image of how the transport vehicle should be loaded according to the vehicle space optimization instructions and the one of a three-dimensional image and a video graphic showing how the transport vehicle should be loaded in accordance with the vehicle space optimization instructions;

loading the first group of products and the second group of products on to the transport vehicle based on the one of a three-dimensional image and a video graphic showing how the transport vehicle should be loaded;

generating a dispatching order for delivery of the first group of products and the second group of products by the transport vehicle based on the delivery route; and performing a check-out procedure to verify that the one or more identified orders are complete.

15. The method of claim 14, further comprising:

monitoring the delivery route as one or more deliveries are completed;

maintaining an inventory of the transport vehicle as the one or more deliveries are completed.

16. The method of claim 15, further comprising:

generating invoices for each delivery that is completed.

17. The method of claim 15, further comprising:

generating a bill for each delivery that is completed.

18. The method of claim 15, further comprising:

performing a check-in procedure after all of the deliveries have been completed to verify that the first group of products associated with the one or more identified orders were delivered.

19. The method of claim 14, further comprising:

providing the second group of products for direct sale to customers from the transport vehicle.

20. A method, comprising, at a direct store delivery central system, when a customer order for a first product is received:

generating a direct store delivery order based on the received customer order;

determining a second product to include with the direct store delivery order, wherein the second product is not specified in the received customer order;

retrieving using a vehicle space optimization interface first and second product information including dimensions of the first and second products and weights of the first and second products, respectively;

retrieving using the vehicle space optimization interface transport vehicle information including a number of transport vehicles to be loaded, interior dimensions of the transport vehicles and weight capacities of the transport vehicles;

determining using the vehicle space optimization interface route information for delivery of the first product to a customer;

determining using a vehicle space optimization processor a loading arrangement of the first and second products in a designated transport vehicle based on the retrieved first and second product information, the retrieved transport vehicle information and the determined route information;

generating using a vehicle space optimization graphics generator an image of the determined loading arrangement of the first and second products in the designated transport vehicle;

generating using a vehicle space optimization processor instructions for how to load the designated transport vehicle in accordance with the determined loading arrangement of the first and second products;

generating using the vehicle space optimization graphics generator video graphics showing how to load the designated transport vehicle in accordance with the determined loading arrangement of the first and second products;

transmitting, to a direct store delivery mobile device, the generated image of the determined loading arrangement of the first and second products in the designated transport vehicle, the generated instructions for how to load the designated transport vehicle in accordance with the determined loading arrangement of the first and second products and the generated video graphics showing how to load the designated transport vehicle in accordance with the determined loading arrangement of the first and second products;

generating using the vehicle space optimization interface an order to retrieve the first and second products;

generating using the vehicle space optimization interface an order to load the designated transport vehicle based on the generated instructions for how to load the designated transport vehicle in accordance with the determined loading arrangement of the first and second products; loading the first and second products on to the designated transport vehicle based on the video graphics showing how to load the designated transport vehicle; and delivering the first product to the customer.

* * * * *

UNITED STATES PATENT AND TRADEMARK OFFICE
CERTIFICATE OF CORRECTION

PATENT NO.         : 7,574,365 B2                          Page 1 of 1
APPLICATION NO.    : 10/747142
DATED              : August 11, 2009
INVENTOR(S)        : Miller et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1529 days.

Signed and Sealed this

Seventh Day of September, 2010

David J. Kappos
*Director of the United States Patent and Trademark Office*